United States Patent
Zhang et al.

(10) Patent No.: US 12,385,737 B2
(45) Date of Patent: Aug. 12, 2025

(54) GAP INSPECTION APPARATUS AND GAP INSPECTION METHOD

(71) Applicant: CONTEMPORARY AMPEREX TECHNOLOGY (HONG KONG) LIMITED, Hong Kong (CN)

(72) Inventors: Fenglin Zhang, Ningde (CN); Jianlin Liu, Ningde (CN); Shaoteng Ren, Ningde (CN); Siyuan Qi, Ningde (CN); Zhimeng Shi, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 32 days.

(21) Appl. No.: 18/365,375

(22) Filed: Aug. 4, 2023

(65) Prior Publication Data

US 2024/0133682 A1    Apr. 25, 2024
US 2024/0230324 A9    Jul. 11, 2024

Related U.S. Application Data

(63) Continuation of application No. PCT/CN2023/085237, filed on Mar. 30, 2023.

(30) Foreign Application Priority Data

Oct. 20, 2022    (CN) .................. 202211290267.X

(51) Int. Cl.
*G01B 21/00*    (2006.01)
*G01B 15/00*    (2006.01)
(Continued)

(52) U.S. Cl.
CPC ............. *G01B 15/00* (2013.01); *G01B 21/16* (2013.01); *H01M 10/045* (2013.01)

(58) Field of Classification Search
CPC .................. G01N 23/04; G01B 21/16
See application file for complete search history.

(56) References Cited

U.S. PATENT DOCUMENTS

2017/0141443 A1*    5/2017    Herklotz ............. H01M 10/482

FOREIGN PATENT DOCUMENTS

| CN | 103925893 A | 7/2014 |
|----|-------------|--------|
| CN | 214296940 A | 9/2021 |

(Continued)

OTHER PUBLICATIONS

ISR for International Application PCT/CN2023/085237 mailed Jun. 29, 2023.

(Continued)

*Primary Examiner* — Dani Fox
(74) *Attorney, Agent, or Firm* — Ladas & Parry LLP

(57) ABSTRACT

A gap inspection apparatus and a gap inspection method are disclosed. The gap inspection apparatus is configured for a wound battery cell, where in a height direction of the wound battery cell. The gap inspection apparatus includes: an X-ray source and an X-ray detector and a bearing mechanism located between the X-ray source and the X-ray detector. The bearing mechanism includes at least one accommodating groove, the accommodating groove is configured to accommodate the wound battery cell, and the height direction of the wound battery cell crosses a first direction in which the X-ray source points to the X-ray detector. The X-ray source is configured to irradiate an arc-shaped area of the wound body portion, and the X-ray detector is configured to obtain an imaging image of the irradiated arc-shaped area, so as to obtain a gap value between two electrode plates within the arc-shaped area.

9 Claims, 7 Drawing Sheets

(51) Int. Cl.
    *G01B 21/16* (2006.01)
    *H01M 10/04* (2006.01)

(56) References Cited

FOREIGN PATENT DOCUMENTS

| | | |
|---|---|---|
| CN | 215727795 U | 2/2022 |
| CN | 114527149 A | 5/2022 |
| CN | 115839684 A | 3/2023 |
| JP | 2002198097 A | 7/2002 |
| JP | 2013072809 A | 4/2013 |
| JP | 2020085690 A | 6/2020 |
| KR | 20160067024 A | 6/2016 |
| WO | 2010073930 A1 | 7/2010 |
| WO | 2022166996 A1 | 8/2022 |

OTHER PUBLICATIONS

Yan Xin et al. "Application of edge detection algorithm in X-ray images of power cell" Non-destructive Testing, vol. 38, Issue 9, (Sep. 30, 2016), pp. 14-16,28 ISSN: 1000-6656, Verses 1-3.
Extended European Search Report dated Apr. 30, 2024 for Application No. EP 23740923.0.
Decision to grant a patent for corresponding EP application No. 23 740 923.0 mailed Nov. 25, 2024.
Notice of Allowance dated Jun. 30, 2025 for application CN 202211290267.X
Qi Yuhan, et al., "CT Imaging System for Standing Wood Based on Fan-Shaped X-Ray Beam", Scientia Silvae Sinicae, vol. 52, No. 7, Jul. 15, 2016, 8 pages.

\* cited by examiner

GAP INSPECTION APPARATUS AND GAP INSPECTION METHOD

CROSS-REFERENCE TO RELATED APPLICATIONS

This application is a continuation of International application PCT/CN2023/085237 filed on Mar. 30, 2023 that claims priority to Chinese Patent Application No. 202211290267.X filed Oct. 20, 2022 which are incorporated herein by reference in their entirety.

TECHNICAL FIELD

This application relates to the field of battery cell inspection technologies, and specifically, to a gap inspection apparatus and a gap inspection method.

BACKGROUND

With rapid development of the new energy industry, electric vehicles that use lithium-ion batteries as traction batteries have begun to be widely used. Quality of the traction battery not only affects service life of the traction battery, but also affects safety of driving.

The traction battery includes several battery cells, and during cycling of the traction battery, a gap value between a positive electrode plate and a negative electrode plate of the battery cell is an important factor affecting migration of lithium ions. For example, when the gap value is large, lithium-ion accumulation and lithium precipitation are likely to occur, resulting in safety risks. Therefore, the gap value needs to be accurately measured during production of the traction battery.

SUMMARY

This application provides a gap inspection apparatus and a gap inspection method, so as to measure a gap value between two electrode plates of a wound battery cell in a simple and efficient way.

To resolve the foregoing technical problems, one technical solution used in this application is implemented as follows: providing a gap inspection apparatus, configured for a wound battery cell, where in a height direction of the wound battery cell, the wound battery cell includes a wound body portion and a tab that are connected to each other, and the gap inspection apparatus includes: an X-ray source and an X-ray detector that are oppositely disposed, and a bearing mechanism located between the X-ray source and the X-ray detector, where the bearing mechanism includes at least one accommodating groove, the accommodating groove is configured to accommodate the wound battery cell, and the height direction of the wound battery cell crosses a first direction in which the X-ray source points to the X-ray detector; and the X-ray source is configured to irradiate an arc-shaped area of the wound body portion, and the X-ray detector is configured to obtain an imaging image of the irradiated arc-shaped area, so as to obtain a gap value between two electrode plates within the arc-shaped area based on the imaging image.

With the foregoing gap inspection apparatus, multi-angle image acquisition, three-dimensional reconstruction, CT tomogram, and other processes are not required for the wound battery cell, and the imaging image of the arc-shaped area of the wound battery cell can be directly obtained through the X-ray source and the X-ray detector, so as to obtain the gap value between the two electrode plates within the arc-shaped area. The inspection process is simple and efficient.

In some embodiments, the bearing mechanism includes a bearing member and a cushion fastener, an accommodating cavity is included on a side of the bearing member facing the X-ray source or the X-ray detector, the cushion fastener is located in the accommodating cavity, and the accommodating groove is disposed on the cushion fastener. The foregoing bearing mechanism 4 has a simple structure and is easy to manufacture.

In some embodiments, in the first direction, the accommodating groove runs through the cushion fastener. Such design can reduce an impact of the cushion fastener on an imaging effect of the wound battery cell.

And/or, a Shore hardness of the cushion fastener is greater than or equal to 40 degrees and less than or equal to 50 degrees. Such design allows the cushion fastener to have both a position limiting effect and a damage reduction effect.

And/or, the cushion fastener includes foam. The cushion fastener made of this material has advantages of good X-ray penetration, light weight, and the like to reduce the impact of the cushion fastener on the imaging effect of the wound battery cell.

In some embodiments, the accommodating groove includes a first accommodating sub-groove and a second accommodating sub-groove that communicate with each other, the first accommodating sub-groove is configured to accommodate the wound body portion, and the second accommodating sub-groove is configured to accommodate the tab, where a preset distance is present between the wound body portion and an inner wall of the first accommodating sub-groove, and a preset distance is present between the tab and an inner wall of the second accommodating sub-groove. Such design can reduce damage to the wound battery cell by the accommodating groove.

In some embodiments, two tabs are provided and arranged on a same side of the wound body portion; and the second accommodating sub-groove is configured to accommodate the two tabs. Such design reduces the difficulty of alignment during placement.

In some embodiments, in a second direction, one pick-and-place slot is disposed on either of two opposite sides of the first accommodating sub-groove, where the second direction is perpendicular to a third direction in which the first accommodating sub-groove points to the second accommodating sub-groove, and a size of the accommodating groove in the third direction is larger than that of the pick-and-place slot. The introduction of the pick-and-place slot can reduce difficulty of picking up or placing the wound battery cell, and reduce the damage to the wound battery cell.

In some embodiments, the cushion fastener is provided with a first error-proofing portion, a second error-proofing portion is disposed in the accommodating cavity, and the first error-proofing portion and the second error-proofing portion cooperate with each other. Such design can reduce the probability of placing the cushion fastener in the bearing member in a wrong direction, improving inspection efficiency.

In some embodiments, the bearing member includes a base plate and a side plate that are connected to each other, and the side plate is arranged around the base plate to form the accommodating cavity, where a material of the base plate includes carbon fiber, and a material of the side plate includes metal. The base plate made of the foregoing material can reduce the impact on the imaging effect of the wound battery cell. The side plate made of the foregoing material can enable the base plate to have a specific bearing capacity, and the side plate limits the cushion fastener, which helps improve a position limiting effect of the cushion fastener on the wound battery cell.

In some embodiments, the bearing member further includes two handles that are oppositely disposed and located on an outer surface of a side of the side plate facing away from the accommodating cavity. The design of the handles allows for easy transport.

To resolve the foregoing technical problems, another technical solution used in this application is implemented as follows: providing a gap inspection method that uses the gap inspection apparatus according to any one of the foregoing embodiments. The gap inspection method includes: placing a wound battery cell in an accommodating groove of a bearing mechanism, and disposing the bearing mechanism between an X-ray source and an X-ray detector that are oppositely disposed, where in a height direction of the wound battery cell, the wound battery cell includes a wound body portion and a tab that are connected to each other, and the height direction of the wound battery cell crosses a first direction in which the X-ray source points to the X-ray detector; making the X-ray source irradiate an arc-shaped area of the wound body portion, so that the X-ray detector obtains an imaging image of the arc-shaped area; and obtaining, based on the imaging image, a gap value between two electrode plates within the arc-shaped area.

In some embodiments, the wound body portion includes a positive electrode plate and a negative electrode plate that are alternately arranged; and the step of obtaining, based on the imaging image, a gap value between two electrode plates in the wound body portion within the arc-shaped area includes: pre-processing the imaging image and obtaining a target area from the pre-processed imaging image; determining position information of the positive electrode plate and the negative electrode plate from the target area based on size information of the positive electrode plate and the negative electrode plate; and obtaining, from the target area based on the position information of the positive electrode plate and the negative electrode plate, a gap value between the positive electrode plate and the negative electrode plate that are adjacent to each other.

BRIEF DESCRIPTION OF DRAWINGS

To describe the technical solutions in the embodiments of this application more clearly, the following briefly describes the accompanying drawings required for describing the embodiments. Apparently, the accompanying drawings in the following descriptions show merely some embodiments of this application, and persons of ordinary skill in the art may still derive other drawings from the accompanying drawings without creative efforts.

Figure 1:
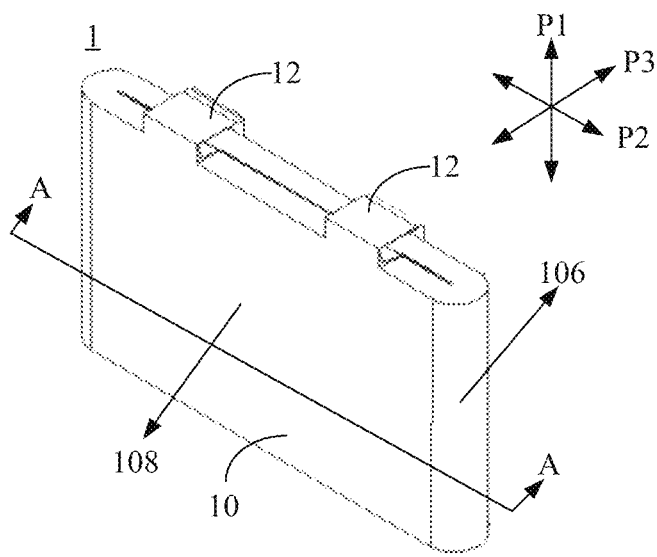
FIG. 1 is a schematic structural diagram of a wound battery cell according to an embodiment.

Specific reference signs are as follows:
wound battery cell 1, wound body portion 10, tab 12;
positive electrode plate 100, negative electrode plate 102, separator 104, positive electrode tab 120, negative electrode tab 122, arc-shaped area 106, planar area 108;
positive electrode current collector 1000, positive electrode active substance layer 1002, negative electrode current collector 1020, negative electrode active substance layer 1022;
gap inspection apparatus 2, X-ray source 20, X-ray detector 22, bearing mechanism 24;
accommodating groove 240, bearing member 242, cushion fastener 244, accommodating cavity 246, pick-and-place slot 248, first error-proofing portion 241, second error-proofing portion 243;
base plate 2420, side plate 2422, handle 2424, first accommodating sub-groove 2400, second accommodating sub-groove 2402;
height direction P1 of the wound battery cell 1, width direction P2 of the wound battery cell 1, thickness direction P3 of the wound battery cell 1, first direction L1, second direction L2, and third direction L3.

DESCRIPTION OF EMBODIMENTS

The following clearly and completely describes the technical solutions in the embodiments of this application with reference to the accompanying drawings in the embodiments of this application. Apparently, the described embodiments are only some but not all of the embodiments of this application. All other embodiments obtained by persons of ordinary skill in the art based on the embodiments of this application without creative efforts shall fall within the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", and "have" and any other variations thereof in the specification, claims and brief description of drawings of this application are intended to cover non-exclusive inclusions.

In the descriptions of the embodiments of this application, the terms "first", "second", and the like are merely intended to distinguish between different objects, and shall not be understood as any indication or implication of relative importance or any implicit indication of the number, specific sequence, or primary-secondary relationship of the technical features indicated. In the descriptions of the embodiments of this application, "a plurality of" means more than two, unless otherwise specifically defined.

In this specification, reference to "embodiment" means that specific features, structures, or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the descriptions of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the descriptions of the embodiments of this application, the term "a plurality of" means two (inclusive) or more. Similarly, "a plurality of groups" means two (inclusive) groups or more, and "a plurality of pieces" means two (inclusive) pieces or more.

In the descriptions of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships shown in the accompanying drawings. These terms are merely for ease and brevity of description of the embodiments of this application rather than indicating or implying that the apparatuses or elements mentioned must have specific orientations or must be constructed or manipulated according to specific orientations, and therefore shall not be construed as any limitation on the embodiments of this application.

In the descriptions of the embodiments of this application, unless otherwise specified and defined explicitly, the technical terms "mount", "connect", "join", and "fasten" should be understood in their general senses. For example, they may refer to a fixed connection, a detachable connection, or an integral connection, may refer to a mechanical connection or electrical connection, and may refer to a direct connection, an indirect connection via an intermediate medium, or an interaction between two elements. Persons of ordinary skill in the art can understand specific meanings of these terms in the embodiments of this application as appropriate to specific situations.

Currently, from a perspective of market development, application of traction batteries is becoming more and more extensive. Traction batteries have been not only used in energy storage power supply systems such as hydroelectric power plants, thermal power plants, wind power plants, and solar power plants, but also widely used in many other fields including electric transportation tools such as electric bicycles, electric motorcycles, and electric vehicles, military equipment, and aerospace. With continuous expansion of application fields of traction batteries, market demands for the traction batteries are also increasing, and the traction batteries including wound battery cells are particularly widely used.

Figure 2:
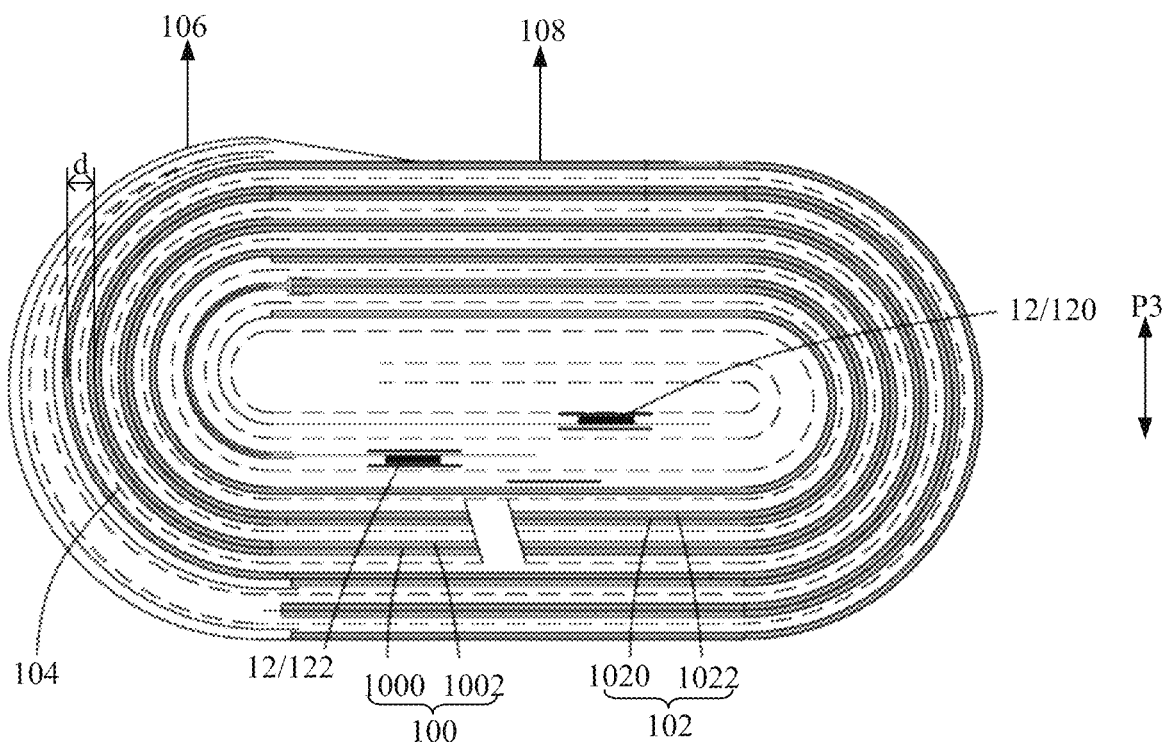
FIG. 2 is a schematic cross-sectional view of the wound battery cell in FIG. 1 along line A-A according to an embodiment.
Figure 3:
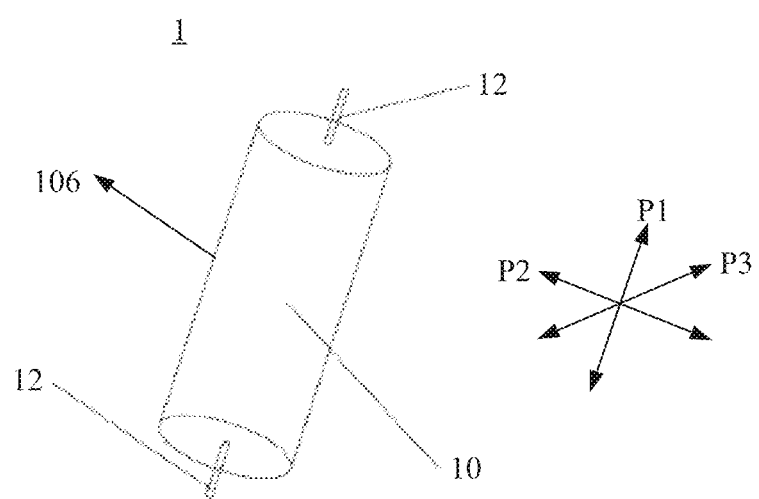
FIG. 3 is a schematic structural diagram of a wound battery cell according to another embodiment.

Refer to FIG. 1 and FIG. 2. FIG. 1 is a schematic structural diagram of a wound battery cell according to an embodiment. FIG. 2 is a schematic cross-sectional view of the wound battery cell in FIG. 1 along line A-A according to an embodiment. First, it is defined that a wound battery cell 1 includes a height direction P1, a width direction P2, and a thickness direction P3 that are perpendicular to each other. In the height direction P1 of the wound battery cell 1, the wound battery cell 1 includes a wound body portion 10 and a tab 12 that are connected to each other. The wound body portion 10 is generally formed by winding a positive electrode plate 100 and a negative electrode plate 102, and a separator 104 is disposed between the positive electrode plate 100 and the negative electrode plate 102. The positive electrode plate 100 includes a positive electrode current collector 1000 and a positive electrode active substance layer 1002 applied on a surface of the positive electrode current collector 1000, and the negative electrode plate 102 includes a negative electrode current collector 1020 and a negative electrode active substance layer 1022 applied on a surface of the negative electrode current collector 1020. In this case, the corresponding tab 12 includes a positive electrode tab 120 and a negative electrode tab 122. The positive electrode tab 120 is connected to the positive electrode plate 100, and the negative electrode tab 122 is connected to the negative electrode plate 102. As shown in FIG. 1, the positive electrode tab 120 and the negative electrode tab 122 may be located on a same side of the wound body portion 10. Certainly, in another embodiment, the positive electrode tab 120 and the negative electrode tab 122 may alternatively be respectively located on opposite sides of the wound body portion 10. This is not limited in this application. In addition, as shown in FIG. 1, the wound body portion 10 of the wound battery cell 1 may be square. Certainly, in another embodiment, as shown in FIG. 3, the wound body portion 10 of the wound battery cell 1 may alternatively be cylindrical. This is not limited in this application.

Further, as shown in FIG. 1, FIG. 2, and FIG. 3, the wound body portion 10 includes an arc-shaped area 106, and the arc-shaped area 106 may be any area with curvature (that is, a non-planar area) on the wound body portion 10, for example, a left or right corner of the wound body portion 10 in FIG. 1; and for another example, any part of the wound body portion 10 in FIG. 2.

The inventors of this application have noticed that, for the wound battery cell 1, during winding of the wound battery cell 1, due to difference between a radius of an inner circle and a radius of an outer circle of the arc-shaped area 106, forces applied on the inner circle and the outer circle are different, resulting in an excessively large gap value may between the negative electrode plate 102 and the positive electrode plate 100 of the inner circle after hot pressing. Currently, a gap value test for the wound battery cell 1 generally adopts the following CT slice inspection method: performing multi-angle image acquisition on the wound battery cell 1, performing three-dimensional reconstruction based on a plurality of acquired images, and then intercepting a model obtained by the three-dimensional reconstruction to obtain a CT tomogram in a preset direction and obtain a corresponding gap value based on the CT tomogram. Obviously, the inspection method has problems of low inspection efficiency and high inspection cost.

Figure 4:
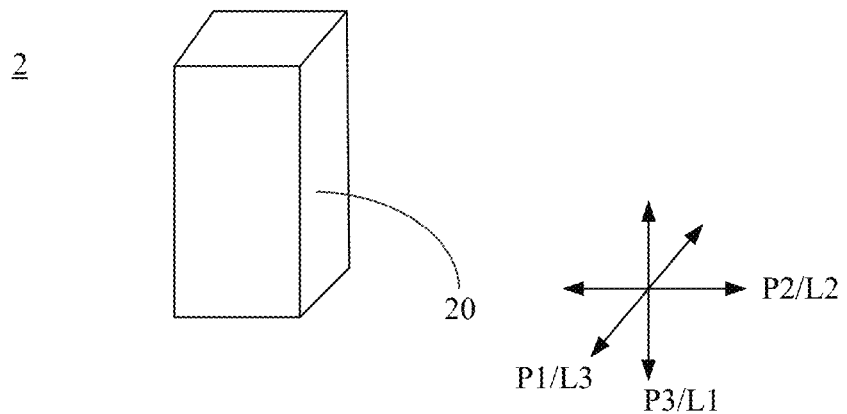
FIG. 4 is a schematic structural diagram of a gap inspection apparatus according to an embodiment of this application.
Figure 4:
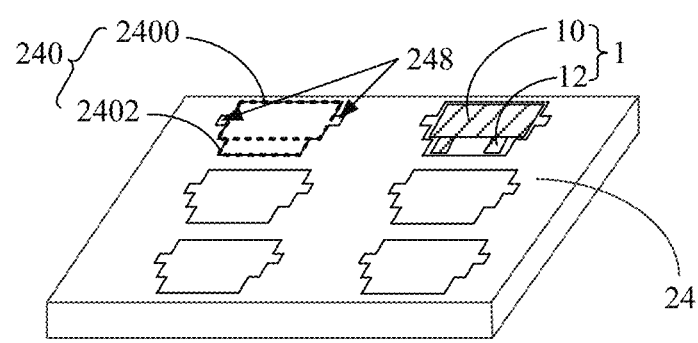
Figure 4:
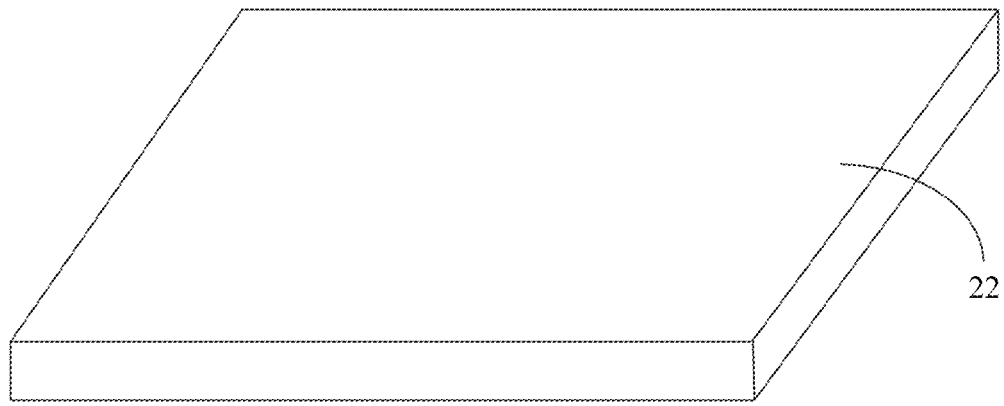

To resolve the foregoing technical problems, refer to FIG. 4. FIG. 4 is a schematic structural diagram of a gap inspection apparatus according to an embodiment of this application. The gap inspection apparatus 2 is configured to measure the gap value of the wound battery cell 1, and includes an X-ray source 20, an X-ray detector 22, and a bearing mechanism 24. The X-ray source 20 and the X-ray detector 22 are arranged opposite to each other and spaced apart, and the bearing mechanism 24 is located between the X-ray source 20 and the X-ray detector 22. The bearing mechanism 24 includes at least one accommodating groove 240, the accommodating groove 240 is configured to accommodate the wound battery cell 1, and during the inspection, the height direction P1 of the wound battery cell 1 crosses a first direction L1 in which the X-ray source 20 points to the X-ray detector 22; and the X-ray source 20 is configured to irradiate the arc-shaped area 106 (as shown in FIG. 1, FIG. 2, and FIG. 3) of the wound body portion 10, and the X-ray detector 22 is configured to obtain an imaging image of the irradiated arc-shaped area 106, so as to obtain a gap value between two electrode plates within the arc-shaped area 106 based on the imaging image.

Specifically, the X-ray source 20 is an apparatus capable of emitting an X-ray. The X-ray detector 22 may be a flat panel detector capable of converting received X-ray energy into a recordable electrical signal by measuring the X-ray energy received by the X-ray detector 22 and generating an electrical signal proportional to an X-ray to form a corresponding image. Optionally, the X-ray detector 22 may include three parts: an X-ray conversion module, a photoelectric conversion module, and a signal reading and transmission module. During the test of the gap inspection apparatus 2, an electron emitted from a cathode of the X-ray source 20, after being accelerated by an electric field between the cathode and an anode, bombards an X-ray source target, to transfer kinetic energy of the electron to an atom on the target. About 1% of the energy is converted into an X-ray, and the X-ray is emitted from an X-ray irradiation window. The emitted X-ray penetrates the wound battery cell 1, and then is imaged by the X-ray detector 22.

In an application scenario, as shown in FIG. 2, an inspection resolution for a gap value d between the negative electrode plate 102 and the positive electrode plate 100 that are adjacent to each other in the wound battery cell 1 needs to be less than 20 microns. To satisfy this inspection requirement, on the one hand, the X-ray source 20 in this application selects an integral microfocus X-ray source. Generally, a smaller focal spot size of the X-ray source 20 indicates a higher imaging image resolution and a clearer imaging picture. The integral microfocus X-ray source has advantages of high stability, low repair rate, small size, easy operation and installation, applicability for a production line, and the like. In this application, to improve X-ray transmittance and improve a signal-to-noise ratio of the imaging image of the wound battery cell 1, a 150 KV microfocus X-ray source is used. On the other hand, in this application, a selected pixel size of the X-ray detector 22 divided by a magnification needs to be less than 20 microns. Optionally, when the magnification is greater than or equal to 5×, the pixel size of the X-ray detector 22 is less than or equal to 100 microns.

The height direction P1 of the wound battery cell 1 crossing a first direction L1 in which the X-ray source 20 points to the X-ray detector 22 indicates that the wound battery cell 1 is lying between the X-ray source 20 and the X-ray detector 22. Preferably, the height direction P1 of the wound battery cell 1 and the first direction L1 are perpendicular to each other, and the first direction L1 and a thickness direction P3 of the wound battery cell 1 are parallel to each other. The X-ray emitted by the X-ray source 20 can penetrate the wound battery cell 1 from the thickness direction P3 of the wound battery cell 1.

Refer to FIG. 2 again. The arc-shaped area 106 may include any area with curvature (that is, a non-planar area) on the wound body portion 10. In the thickness direction P3, the positive electrode plate 100 and the negative electrode plate 102 that are adjacent to each other within the arc-shaped area 106 are not completely blocked from each other. After irradiation by the X-ray source 20, the X-ray detector 22 is able to obtain an imaging image of the positive electrode plate 100 and the negative electrode plate 102 that are spaced apart within the arc-shaped area 106. In addition, as shown in FIG. 1 and FIG. 2, when the wound body portion 10 further includes a planar area 108, the positive electrode plate 100 and the negative electrode plate 102 that are adjacent to each other are completely blocked from each other in the thickness direction P3. After irradiation by the X-ray source 20, in the imaging image obtained by the X-ray detector 22, the positive electrode plate 100 and the negative electrode plate 102 that are adjacent to each other overlap, and the gap value d between the positive electrode plate 100 and the negative electrode plate 102 cannot be accurately obtained. That is, the X-ray source 20 in the gap inspection apparatus 2 provided in this application needs to irradiate to the arc-shaped area 106 of the wound body portion 10.

In addition, it can be known that after the X-ray detector 22 obtains an imaging image of the irradiated arc-shaped area 106, a gap value between any two electrode plates within the arc-shaped area 106 can be obtained based on the imaging image. The any two electrode plates may be the positive electrode plate 100 and the negative electrode plate 102 that are adjacent to each other, two adjacent positive electrode plates 100 that are spaced apart, or two adjacent negative electrode plates 102 that are spaced apart. In addition, the any two electrode plates may be located on an innermost side of the arc-shaped area 106 or at other positions of the arc-shaped area 106. This is not limited in this application.

In summary, with the foregoing gap inspection apparatus 2, multi-angle image acquisition, three-dimensional reconstruction, CT tomogram, and other processes are not required for the wound battery cell 1, and the imaging image of the arc-shaped area 106 of the wound battery cell 1 can be directly obtained through the X-ray source 20 and the X-ray detector 22, so as to obtain the gap value between the two electrode plates within the arc-shaped area 106. The inspection process is simple and efficient.

Figure 5:
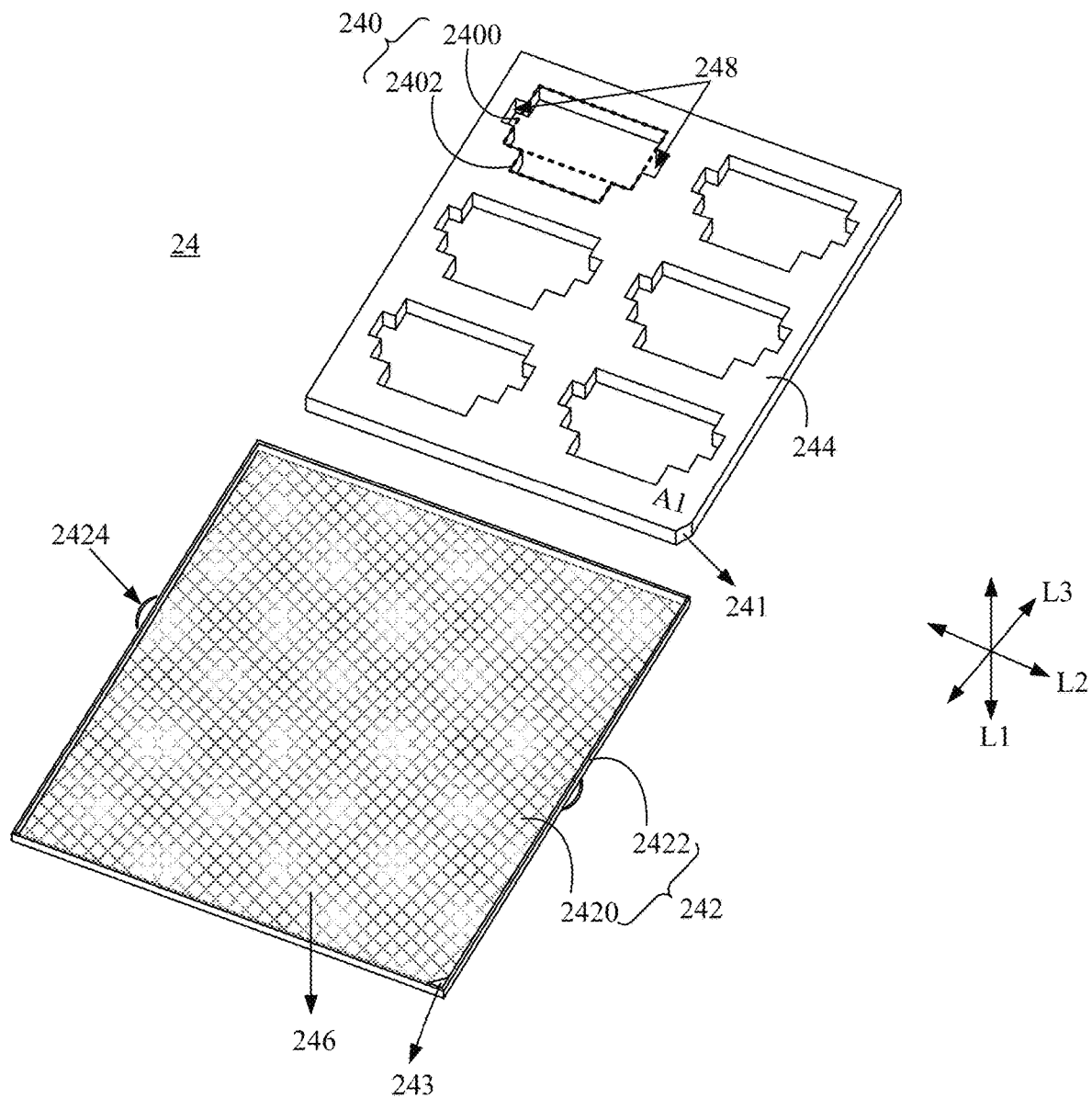
FIG. 5 is a schematic exploded view of a bearing mechanism in FIG. 4 according to an embodiment.

Refer to FIG. 5. FIG. 5 is a schematic exploded view of a bearing mechanism in FIG. 4 according to an embodiment. The bearing mechanism 24 includes a bearing member 242 and a cushion fastener 244, an accommodating cavity 246 is included on a side of the bearing member 242 facing the X-ray source 20 or the X-ray detector 22, the cushion fastener 244 is located in the accommodating cavity 246, and the accommodating groove 240 is disposed on the cushion fastener 244. The foregoing bearing mechanism 24 has a simple structure and is easy to manufacture.

Specifically, the accommodating cavity 246 being included on a side of the bearing member 242 facing the X-ray source 20 or the X-ray detector 22 indicates that when the X-ray source 20 is located above the bearing mechanism 24 and the X-ray detector 22 is located below the bearing mechanism 24, the accommodating cavity 246 is included on a side of the bearing member 242 facing the X-ray source 20 above the bearing member 242. When the X-ray detector 22 is located above the bearing mechanism 24 and the X-ray source 20 is located below the bearing mechanism 24, the accommodating cavity 246 is included on a side of the bearing member 242 facing the X-ray detector 22 above the bearing member 242.

The accommodating cavity 246 is a non-closed cavity, and the accommodating cavity 246 has an opening on a side facing the X-ray source 20 or the X-ray detector 22. On the one hand, the cushion fastener 244 and the wound battery cell 1 under test can easily enter and exit the bearing member 242 from the opening; on the other hand, a blocking effect on the X-ray from the bearing member 242 can be reduced to improve a subsequent imaging effect. When the side of the bearing member 242 facing the X-ray source 20 includes the accommodating cavity 246, the X-ray emitted by the X-ray source 20 sequentially penetrates the wound battery cell 1 and the bearing member 242 on a side of the wound battery cell 1. When the side of the bearing member 242 facing the X-ray detector 22 includes the accommodating cavity 246, the X-ray emitted by the X-ray source sequentially penetrates the bearing member 242 on a side of the wound battery cell 1 and the wound battery cell 1.

As shown in FIG. 5, the bearing member 242 includes a base plate 2420 and a side plate 2422 that are connected to each other, and the side plate 2422 is arranged around the base plate 2420 to form the accommodating cavity 246, that is, in this case, the side plate 2422 is of an annular structure. The bearing member 242 has a simple structural design and is easy to manufacture.

Optionally, a material of the base plate 2420 includes carbon fiber. In this case, the base plate 2420 is a carbon fiber plate formed by infiltrating and hardening carbon fibers arranged in a same direction with resin, which has advantages of low density, good X-ray penetration, light weight, good flexibility, good durability, corrosion resistance, and the like, that is, the base plate 2420 made of this material can reduce an impact on the imaging effect of the wound battery cell 1. Preferably, a thickness of the base plate 2420 in the first direction L1 is 1.5 mm to 2.5 mm (for example, 2 mm).

Optionally, a material of the side plate 2422 includes metal (for example, stainless steel). The side plate 2422 does not impact the imaging effect of the wound battery cell 1, and therefore the side plate 2422 does not require high X-ray penetration. The side plate 2422 made of the foregoing metal material is able to fasten the base plate 2420, so that the base plate 2420 has a specific bearing capacity, and the side plate 2422 limits the cushion fastener 244, which helps improve a position limiting effect of the cushion fastener 244 on the wound battery cell 1, thereby further improving accuracy of a testing position.

Optionally, the bearing member 242 further includes two handles 2424 that are oppositely disposed and located on an outer surface of a side of the side plate 2422 facing away from the accommodating cavity 246. The design of the handles 2424 allows for easy transport. Preferably, a material of the handle 2424 is metal, and the handle 2424 may be integrally formed with the side plate 2422. In addition, a shape of the handle 2424 may be arc-shaped and the like, to facilitate grasping.

The cushion fastener 244 is a member that can be deformed to a specific extent and can limit and fasten the wound battery cell 1. On the one hand, when the device shakes or moves, the cushion fastener 244 can cushion a stress by deformation of the cushion fastener 244, reducing the probability that the position of the wound battery cell 1 deviates. On the other hand, during fetching of the wound battery cell 1, the cushion fastener 244 has little interference with the wound battery cell 1, which can reduce damage to the wound battery cell 1.

Optionally, the cushion fastener 244 includes foam. For example, the cushion fastener 244 is made of EVA (ethylene-vinyl acetate copolymer) and the like. The cushion fastener 244 made of this material has advantages of good X-ray penetration, light weight, and the like to reduce the impact of the cushion fastener 244 on the imaging effect of the wound battery cell 1.

Optionally, a Shore hardness of the cushion fastener 244 is greater than or equal to 40 degrees and less than or equal to 50 degrees. For example, the Shore hardness of the cushion fastener 244 is 45 degrees or the like. Generally, a lower hardness indicates a greater deformation capacity of the cushion fastener 244 and a poorer position limiting effect on the wound battery cell 1. A higher hardness indicates a greater probability of the cushion fastener 244 damaging the wound battery cell 1 when the wound battery cell 1 is picked up or placed. Therefore, the cushion fastener 244 in the foregoing Shore hardness range is designed based on comprehensive consideration of the two factors, so that the cushion fastener 244 can have both a position limiting effect and a damage reduction effect.

Optionally, in the first direction L1, the accommodating groove 240 runs through the cushion fastener 244. Specifically, the base plate 2420 is exposed from the accommodating groove 240. Compared to the accommodating groove 240 not running through the cushion fastener 244, in such design, the X-ray needs to penetrate only the arc-shaped area 106 of the wound battery cell 1 and the base plate 2420 at a corresponding position before being received by the X-ray detector 22, to reduce the impact of the cushion fastener 244 on the imaging effect of the wound battery cell 1.

Still refer to FIG. 4 and FIG. 5. The accommodating groove 240 includes a first accommodating sub-groove 2400 and a second accommodating sub-groove 2402 that communicate with each other. The first accommodating sub-groove 2400 is configured to accommodate the wound body portion 10, and the second accommodating sub-groove 2402 is configured to accommodate the tab 12. A preset distance is present between the wound body portion 10 and an inner wall of the first accommodating sub-groove 2400, and a preset distance is present between the tab 12 and an inner wall of the second accommodating sub-groove 2402. In other words, a size of the accommodating groove 240 is larger than a size of the wound battery cell 1 to be accommodated in the accommodating groove 240, so as to reduce damage to the wound battery cell 1 by the accommodating groove 240.

Optionally, the preset distance is 0.5 mm to 1.5 mm (for example, 1 mm). In such design, the size of the accommodating groove 240 is slightly larger than the size of the wound battery cell 1 be accommodated in the accommodating groove 240, so as to reduce the damage to the wound battery cell 1 by the accommodating groove 240 and ensure the position limiting effect of the cushion fastener 244 on the wound battery cell 1.

Optionally, as shown in FIG. 4, a second direction L2 and a third direction L3 that are perpendicular to each other are defined. A direction in which the first accommodating sub-groove 2400 points to the second accommodating sub-groove 2402 is the third direction L3. The third direction L3 and the height direction P1 of the wound battery cell 1 are parallel to each other, and the second direction L2 and the width direction P2 of the wound battery cell 1 are parallel to each other. Generally, in the second direction L2, a width of the wound body portion 10 is greater than a width of the tab 12. Correspondingly, a width of the first accommodating sub-groove 2400 is greater than a width of the second accommodating sub-groove 2402.

Figure 6:
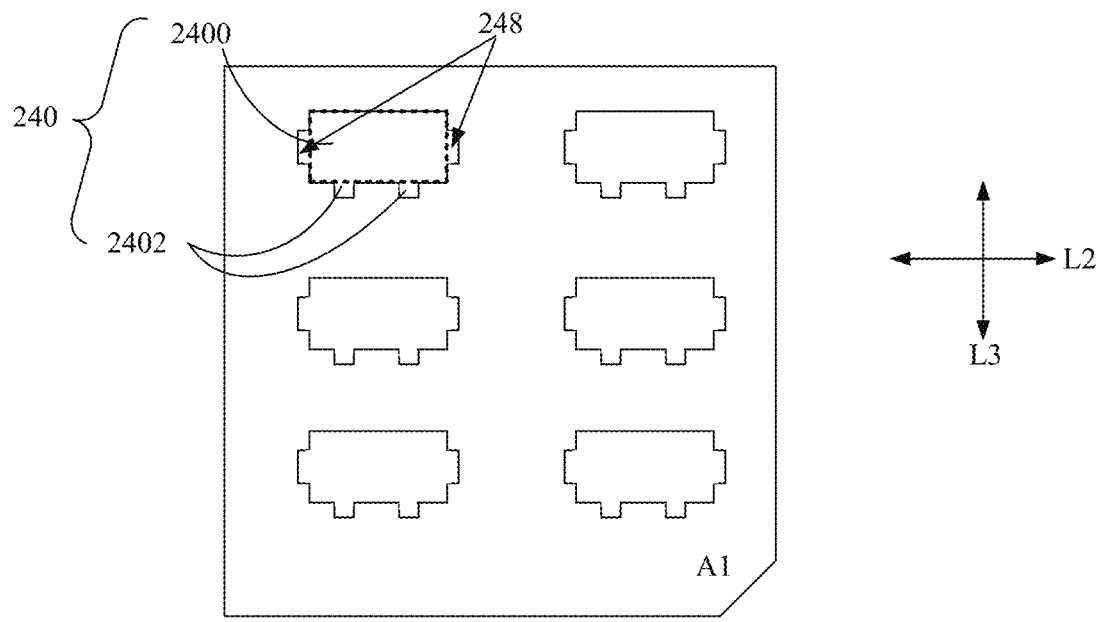
FIG. 6 is a schematic structural diagram of a cushion fastener in FIG. 4 according to another embodiment.

Refer to FIG. 1 and FIG. 6 together. FIG. 6 is a schematic structural diagram of a cushion fastener in FIG. 4 according to another embodiment. Generally, two tabs 12 are provided, and two corresponding second accommodating sub-grooves 2402 are provided. For example, when the two tabs 12 are disposed on a same side of the wound body portion 10, the two second accommodating sub-grooves 2402 are disposed on a same side of the first accommodating sub-groove 2400, and the two second accommodating sub-grooves 2402 may not communicate with each other. Further, when sizes of the two tabs 12 are different, sizes of the two corresponding second accommodating sub-grooves 2402 are also different. Therefore, it is necessary to ensure that an alignment relationship between the two tabs 12 and the two corresponding second accommodating sub-grooves 2402 is correct during placement. In order to reduce a difficulty of alignment during the placement, alignment marks may be provided at positions of the second accommodating sub-grooves 2402.

Certainly, this may also be implemented in another manner. For example, refer to FIG. 4 and FIG. 5. The two second accommodating sub-grooves 2402 in FIG. 6 may communicate with each other, that is, in this case, it is considered that one second accommodating sub-groove 2402 is present and configured to accommodate the two tabs 12. Such design reduces the difficulty of alignment during placement.

Still refer to FIG. 4, FIG. 5, and FIG. 6. In the second direction L2, one pick-and-place slot 248 is disposed on either of two opposite sides of the first accommodating sub-groove 2400, and the pick-and-place slot 248 communicates with the first accommodating sub-groove 2400. Use of the pick-and-place slot 248 can reduce difficulty of picking up or placing the wound battery cell 1, and reduce the damage to the wound battery cell 1. The second direction L2 is perpendicular to the third direction L3 in which the first accommodating sub-groove 2400 points to the second accommodating sub-groove 2402, and in the third direction L3, a size of the first accommodating sub-groove 2400 is larger than a size of the pick-and-place slot 248. For example, in the third direction L3, the size of the first accommodating sub-groove 2400 is twice the size of the pick-and-place slot 248. Such design can reduce the impact on a position of the wound battery cell from the pick-and-place slot 248 in use, to ensure the position limiting effect of the accommodating groove 240 on the wound battery cell.

Still refer to FIG. 4. The cushion fastener 244 is provided with a first error-proofing portion 241, a second error-proofing portion 243 is disposed in the accommodating cavity 246, and the first error-proofing portion 241 and the second error-proofing portion 243 cooperate with each other. Such design of the first error-proofing portion 241 and the second error-proofing portion 243 can reduce the probability of placing the cushion fastener 244 in the bearing member 242 in a wrong direction, improving inspection efficiency.

Optionally, as shown in FIG. 4, the cushion fastener 244 includes a plurality of corners, one of the corners is provided with a notch to form the first error-proofing portion 241, and the corresponding second error-proofing portion 243 is a protrusion that matches the notch. Alternatively, in another embodiment, a specific area of the cushion fastener 244 is provided with a via hole, and a position of the accommodating cavity 246 corresponding to the via hole is provided with a protrusion.

Figure 7:
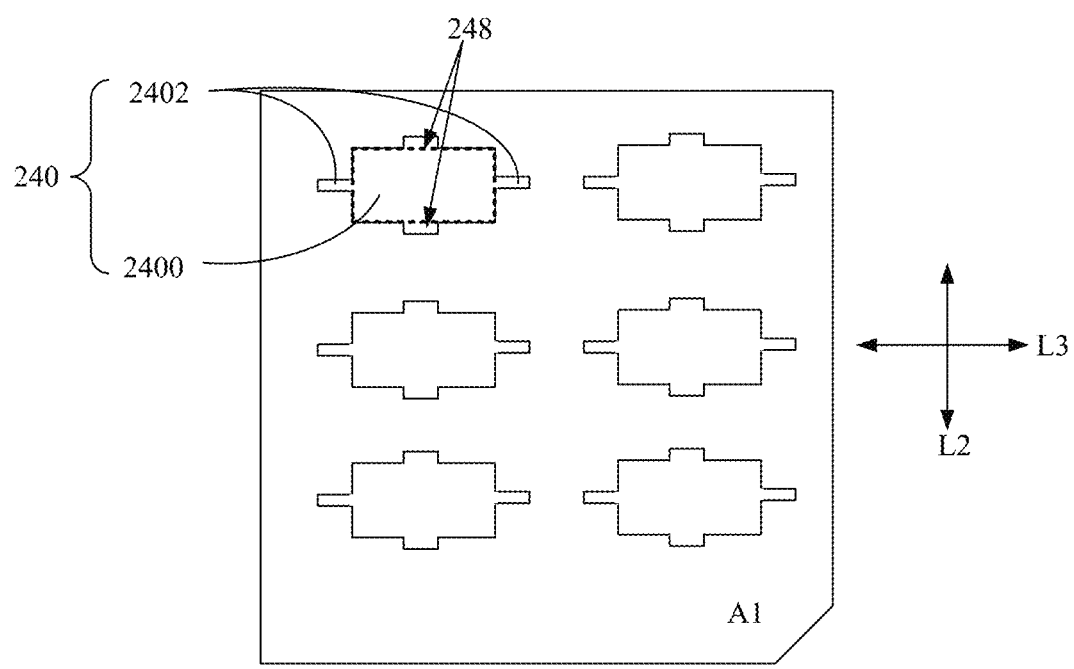
FIG. 7 is a schematic structural diagram of a cushion fastener in FIG. 4 according to another embodiment.

In addition, structures of the accommodating groove 240 in FIG. 4, FIG. 5, and FIG. 6 are designed to correspond to the square wound battery cell in FIG. 1. When an object under test is a cylindrical wound battery cell in FIG. 3, as shown in FIG. 7, FIG. 7 is a schematic structural diagram of a cushion fastener in FIG. 4 according to another embodiment. The structure of the accommodating groove 240 on the cushion fastener 244 can be designed to be adapted to the cylindrical wound battery cell shown in FIG. 3.

Further, to distinguish the cushion fasteners 244 corresponding to wound battery cells of different models, as shown in FIG. 5, FIG. 6, and FIG. 7, a surface of a side of the cushion fastener 244 facing away from the base plate 2420 may be provided with a marking area (that is, the position marked as A1 in FIG. 5, FIG. 6, and FIG. 7). A type and a number of a battery cell under test are provided in the marking area, which helps quickly identify the cushion fastener 244 corresponding to the current wound battery cell under test.

Figure 8:
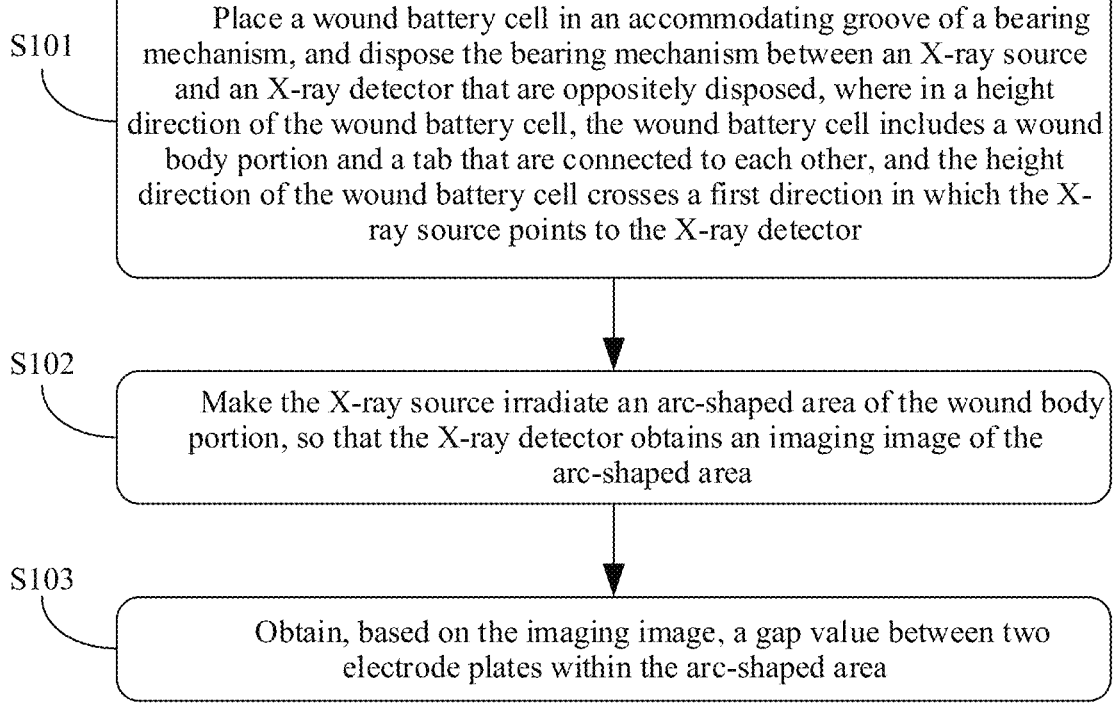
FIG. 8 is a schematic flowchart of a gap inspection method according to an embodiment of this application.

The gap inspection apparatus provided in this application is further described below from a perspective of a gap inspection method. Refer to FIG. 1, FIG. 4, and FIG. 8 together. FIG. 8 is a schematic flowchart of a gap inspection method according to an embodiment of this application. The gap inspection method includes the following steps.

S101: Place a wound battery cell 1 in an accommodating groove 240 of a bearing mechanism 24, and dispose the bearing mechanism 24 between an X-ray source 20 and an X-ray detector 22 that are oppositely disposed, where in a height direction P1 of the wound battery cell 1, the wound battery cell 1 includes a wound body portion 10 and a tab 12 that are connected to each other, and the height direction P1 of the wound battery cell 1 crosses a first direction L1 in which the X-ray source 20 points to the X-ray detector 22.

Specifically, the wound battery cell 1 may be picked from a production line and put into the bearing mechanism 24. In this case, the wound battery cell 1 is a bare cell, that is, in an unpackaged state. Generally, the bearing mechanism 24 is provided with a plurality of accommodating grooves 240. In this case, one wound battery cell 1 may be placed in the accommodating grooves 240, and inspection may be performed on each wound battery cell 1.

S102: Make the X-ray source 20 irradiate an arc-shaped area 106 of the wound body portion 10, so that the X-ray detector 22 obtains an imaging image of the arc-shaped area 106.

Specifically, an X-ray emitted by the X-ray source 20 can penetrate the arc-shaped area 106 of the wound battery cell 1, and the X-ray detector 22 converts a received X-ray into an electrical signal for imaging. Due to different penetrability of the X-ray for different structures and materials in a sample, an internal structure of the sample can be captured by the X-ray detector 22 and presented on a computer.

S103: Obtain, based on the imaging image, a gap value between the two electrode plates within the arc-shaped area 106.

Figure 9:
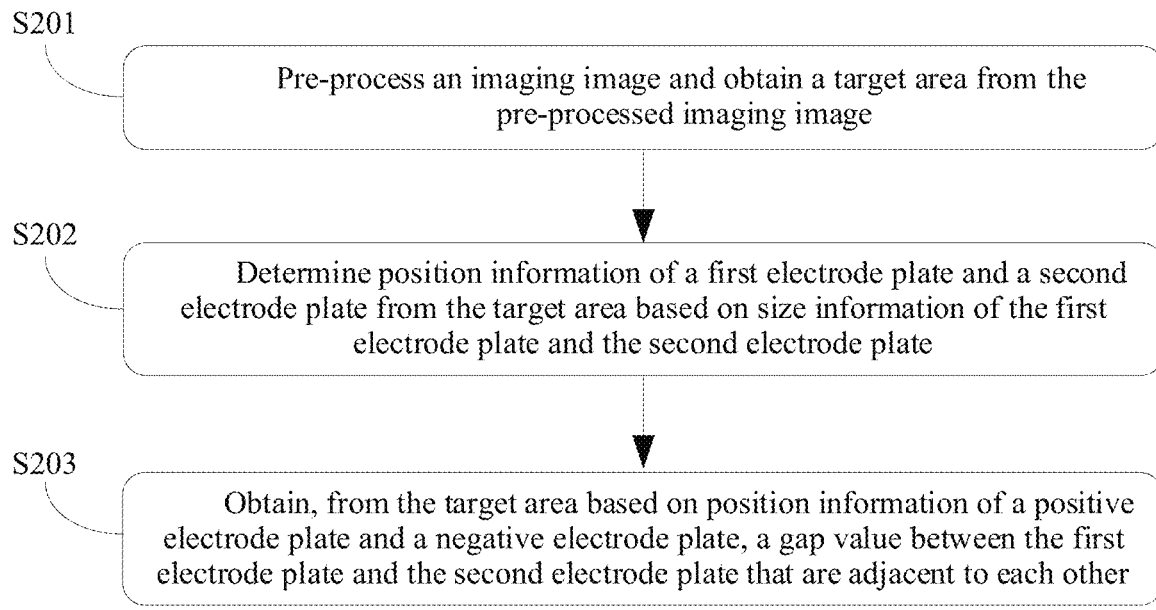
FIG. 9 is a schematic flowchart of step S103 in FIG. 8 corresponding to an embodiment.

Specifically, refer to FIG. 9. FIG. 9 is a schematic flowchart of step S103 in FIG. 8 corresponding to an embodiment. A specific implementation process of step S103 includes:

S201: Pre-process the imaging image and obtain a target area from the pre-processed imaging image.

Figure 10:
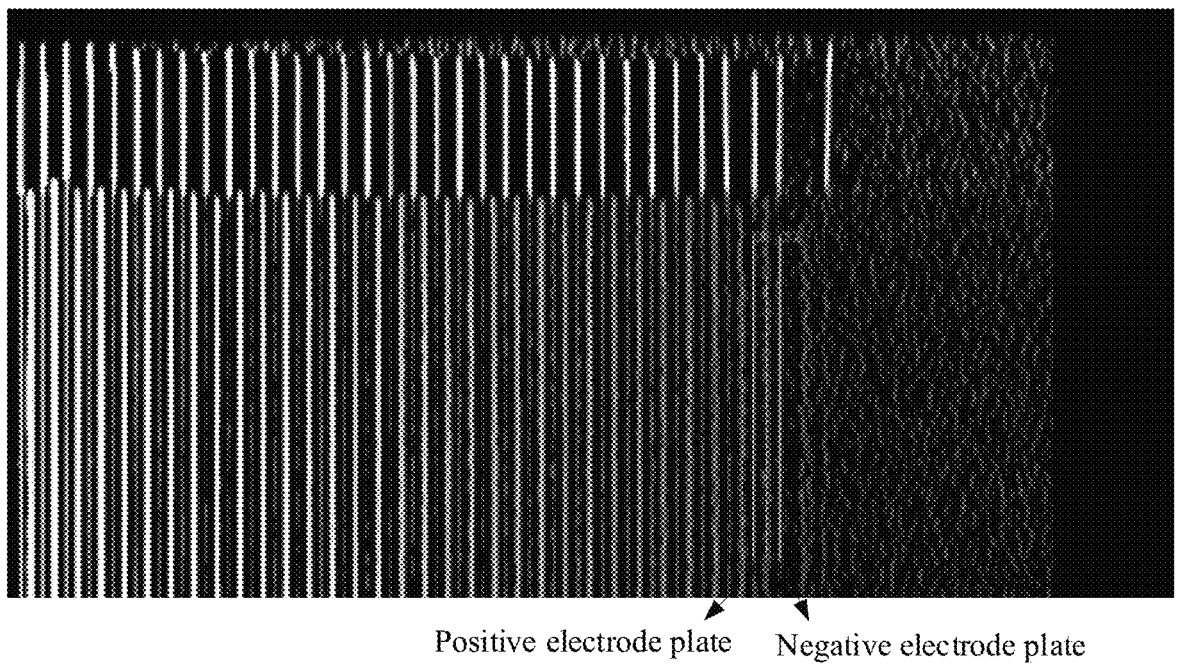
FIG. 10 is a schematic diagram of a target area obtained after step S201 in FIG. 9 according to an embodiment.

Specifically, a pre-processing process may include four steps: noise reduction by multi-frame superimposing and averaging, region of interest (ROI) interception, contrast enhancement, and filtering. Noise reduction by multi-frame superimposing and averaging is to superimpose and then average a plurality of frames of imaging images continuously collected by the X-ray detector 22, assign an average value to a corresponding new image, save a new image after noise reduction, and release memory, thereby reducing image noise and facilitating subsequent processing. ROI interception is to perform target area cropping on the new image to crop out a target area for inspection, to improve image processing accuracy and processing time. Contrast enhancement is to extract contrast of each part of an original image, highlight positive and negative electrode plate lines in the target area, and weaken an area not for inspection, so as to display the image more clearly. Filtering is to use a template to scan each pixel in the image and replace a value of a pixel point at a center of the template with a weighted average gray value of pixels in a neighboring area determined by the template, to make the image favorable for manual recognition. Specifically, as shown in FIG. 10, FIG. 10 is a schematic diagram of a target area obtained after step S201 in FIG. 9 according to an embodiment.

S202: Determine position information of the positive electrode plate 100 and the negative electrode plate 102 from the target area based on size information of the positive electrode plate 100 and the negative electrode plate 102.

Specifically, due to difference between the materials of the positive electrode plate 100 and the negative electrode plate 102, a width of the negative electrode plate 102 is wider than a width of the positive electrode plate 100. Therefore, positions of the positive electrode plates 100 and the negative electrode plates 102 may be determined from the target area based on the size information of the positive electrode plate 100 and the negative electrode plate 102.

S203: Obtain, from the target area based on the position information of the positive electrode plate 100 and the negative electrode plate 102, a gap value between the positive electrode plate 100 and the negative electrode plate 102 that are adjacent to each other.

Specifically, as shown in FIG. 10, after the positions of the positive electrode plates 100 and the negative electrode plates 102 are determined, a line may be drawn at a position 0.8 mm below a starting point of the negative electrode plate 102, and a center of the line is the brightest position of the negative electrode plate 102 (that is, a center position of the electrode plate). Similarly, a line may be drawn at a position 1 mm below a starting point of the positive electrode plate 100, and a center of the line is the brightest position of the positive electrode plate 100 (that is, a center position of the electrode plate). In this embodiment, for the convenience of distinction, a height of drawing the line of the positive electrode plate 100 is lower than a height of drawing the line of the negative electrode plate 102. Certainly, in another embodiment, another manner may also be used for distinction. For example, distinction is implemented by setting different line types and/or line colors, where the line types include solid line, dashed line, and the like. Subsequently, a gap value from a negative electrode line to a positive electrode line may be automatically measured, and the measured gap value is a distance from a center of the negative electrode plate 102 to a center of the positive electrode plate 100. Then, the measured gap value may be compared with a risk threshold, and if the gap value is greater than or equal to the risk threshold, it is determined that the wound battery cell is unqualified; or if the gap value is less than the risk threshold, it is determined that the wound battery cell is qualified. Inspectors can classify qualified and unqualified wound battery cells, and feedback an inspection result to a production line in a timely manner.

To verify accuracy of the gap inspection method provided in this application, three wound battery cells were randomly selected from the production line, and the three wound battery cells were tested by using the gap inspection method provided in this application and the CT slice inspection method in the prior art. Relative errors between gap values obtained by using the two testing methods were compared. As shown in table 1 below, table 1 lists comparison of test results obtained in the prior art and this application.

TABLE 1

Comparison of test results obtained in the prior art and this application

| | Relative error (last circle) | | | | Relative error (last but one circle) | | | |
|---|---|---|---|---|---|---|---|---|
| | Test point 1 | Test point 2 | Test point 3 | Test point 4 | Test point 1 | Test point 2 | Test point 3 | Test point 4 |
| Sample 1 | 0.0% | 8.7% | 6.9% | 6.9% | 13.8% | 17.5% | 0.0% | 17.8% |
| Sample 2 | 10.0% | 3.6% | 19.3% | 17.6% | 26.7% | 10.7% | 3.8% | 16.7% |
| Sample 3 | 18.6% | 11.1% | 18.7% | 13.8% | 16.7% | 11.1% | 3.8% | 16.7% |

Specifically, relative error=|(measured value obtained by using CT slice inspection method−measured value obtained by using inspection method in this application)|/measured value obtained by using inspection method in this application*100%. As shown in Table 1, the relative errors between the gap values obtained by using the two methods were less than 20%, and the accuracy of the gap inspection method provided in this application is higher.

In a specific application scenario, the gap inspection apparatus provided in this application uses a 150 KV microfocus X-ray source, a flat panel detector with a pixel size less than or equal to 100 microns and a magnification greater than or equal to 5×, and a bearing mechanism with a bearing capacity of more than 25 KG. The bearing mechanism includes the bearing member and the cushion fastener. The base plate in the bearing member is made of a carbon fiber plate, the side plate is made of stainless steel, and a height of the accommodating cavity formed by the side plate and the base plate in the bearing mechanism in the first direction is 10 mm. The cushion fastener is made of a black EVA foam with a Shore hardness of 45 degrees and a height of 20 mm in the first direction. One of the corners of the cushion fastener has a triangular notch to form the first error-proofing portion, and the second error-proofing portion in a form of a triangular protrusion matching a shape of the triangular notch is disposed in the corresponding accommodating cavity. When the cushion fastener is disposed in the accommodating cavity, the first error-proofing portion and the second error-proofing portion abut against each other. In addition, a position of the cushion fastener adjacent to the first error-proofing portion is provided with a number, for example, a type and a number of a battery cell under test.

The foregoing descriptions are merely the embodiments of this application, but are not intended to limit the patent scope of this application. Any equivalent structural transformations or equivalent process transformations made by using the content of the specification and drawings or direct or indirect application of the content of the specification and drawings to other related technical fields should fall within the patent protection scope of this application.

The invention claimed is:

1. A gap inspection apparatus, characterized by being configured for a wound battery cell, wherein in a height direction (P1) of the wound battery cell, the wound battery cell comprises a wound body portion and a tab that are connected to each other, and the gap inspection apparatus comprises:
   an X-ray source and an X-ray detector that are oppositely disposed, and a bearing mechanism located between the X-ray source and the X-ray detector;
   wherein the bearing mechanism comprises at least one accommodating groove, the accommodating groove is configured to accommodate the wound battery cell, and the height direction of the wound battery cell crosses a first direction (LI) in which the X-ray source points to the X-ray detector; and the X-ray source is configured to irradiate an arc-shaped area of the wound body portion, and the X-ray detector is configured to obtain an imaging image of the irradiated arc-shaped area, so as to obtain a gap value between two electrode plates within the arc-shaped area based on the imaging image; wherein
   the bearing mechanism comprises a bearing member and a cushion fastener, an accommodating cavity is comprised on a side of the bearing member facing the X-ray source or the X-ray detector, the cushion fastener is located in the accommodating cavity, and the accommodating groove is disposed on the cushion fastener; characterized in that:
   the accommodating groove comprises a first accommodating sub-groove and a second accommodating sub-groove that communicate with each other, the first accommodating sub-groove is configured to accommodate the wound body portion, and the second accommodating sub-groove is configured to accommodate the tab, wherein a preset distance is present between the wound body portion and an inner wall of the first accommodating sub-groove, and a preset distance is present between the tab and an inner wall of the second accommodating sub-groove.

2. The gap inspection apparatus according to claim 1, wherein:
   in the first direction (LI), the accommodating groove runs through the cushion fastener; and/or the cushion fastener comprises foam.

3. The gap inspection apparatus according to claim 1, wherein:
   two tabs are provided and arranged on a same side of the wound body portion; and the second accommodating sub-groove is configured to accommodate the two tabs.

4. The gap inspection apparatus according to claim 1, wherein:
   in a second direction (L2), one pick-and-place slot communicating with the first accommodating sub-groove is disposed on either of two opposite sides of the first accommodating sub-groove, wherein the second direction (L2) is perpendicular to a third direction (L3) in which the first accommodating sub-groove points to the second accommodating sub-groove, and a size of the accommodating groove in the third direction (L3) is larger than that of the pick-and-place slot.

5. The gap inspection apparatus according to claim 1, wherein
   the cushion fastener is provided with a first error-proofing portion, a second error-proofing portion is disposed in the accommodating cavity, and the first error-proofing portion and the second error-proofing portion cooperate with each other.

6. The gap inspection apparatus according to claim 1, wherein
   the bearing member comprises a base plate and a side plate that are connected to each other, and the side plate is arranged around the base plate to form the accommodating cavity;
   wherein a material of the base plate comprises carbon fiber, and a material of the side plate comprises metal.

7. The gap inspection apparatus according to claim 6, wherein
   the bearing member further comprises two handles that are oppositely disposed and located on an outer surface of a side of the side plate facing away from the accommodating cavity.

8. A gap inspection method, comprising using the gap inspection apparatus according to claim 1, wherein the gap inspection method comprises:
   placing a wound battery cell in an accommodating groove of the bearing mechanism, and disposing the bearing mechanism between an X-ray source and an X-ray detector that are oppositely disposed, wherein in a height direction of the wound battery cell, the wound battery cell comprises a wound body portion and a tab that are connected to each other, and the height direction of the wound battery cell crosses a first direction in which the X-ray source points to the X-ray detector;
   making the X-ray source irradiate an arc-shaped area of the wound body portion, so that the X-ray detector obtains an imaging image of the arc-shaped area; and
   obtaining, based on the imaging image, a gap value between two electrode plates within the arc-shaped area.

9. The gap inspection method according to claim 8, wherein the wound body portion comprises a positive electrode plate and a negative electrode plate that are alternately arranged; and the step of obtaining, based on the imaging image, a gap value between two electrode plates in the wound body portion within the arc-shaped area comprises:
   pre-processing the imaging image and obtaining a target area from the pre-processed imaging image;
   determining position information of the positive electrode plate and the negative electrode plate from the target area based on size information of the positive electrode plate and the negative electrode plate; and
   obtaining, from the target area based on the position information of the positive electrode plate and the negative electrode plate, a gap value between the positive electrode plate and the negative electrode plate that are adjacent to each other.

* * * * *